United States Patent
Bossa

(10) Patent No.: US 12,240,070 B2
(45) Date of Patent: Mar. 4, 2025

(54) GEARBOX CASE WITH WEAR SLEEVE

(71) Applicant: Mid-States Oilfield Machine LLC, Oklahoma City, OK (US)

(72) Inventor: John Floyd Bossa, El Reno, OK (US)

(73) Assignee: Mid-States Oilfield Machine LLC, Oklahoma City, OK (US)

( * ) Notice: Subject to any disclaimer, the term of this patent is extended or adjusted under 35 U.S.C. 154(b) by 0 days.

(21) Appl. No.: 18/386,917

(22) Filed: Nov. 3, 2023

(65) Prior Publication Data

US 2024/0066642 A1    Feb. 29, 2024

Related U.S. Application Data

(63) Continuation of application No. 17/586,192, filed on Jan. 27, 2022, now Pat. No. 11,806,821, which is a continuation of application No. 16/792,485, filed on Feb. 17, 2020, now Pat. No. 11,261,954.

(60) Provisional application No. 62/807,456, filed on Feb. 19, 2019.

(51) Int. Cl.
| | |
|---|---|
| *B23P 6/00* | (2006.01) |
| *B23P 19/04* | (2006.01) |
| *F16C 35/07* | (2006.01) |
| *F16C 35/077* | (2006.01) |
| *F16H 1/20* | (2006.01) |
| *F16H 57/02* | (2012.01) |
| *F16H 57/021* | (2012.01) |
| *F16H 57/03* | (2012.01) |
| *F16H 57/032* | (2012.01) |
| *F16H 57/00* | (2012.01) |

(52) U.S. Cl.
CPC ........... *B23P 6/00* (2013.01); *B23P 19/04* (2013.01); *F16C 35/077* (2013.01); *F16H 1/20* (2013.01); *F16H 57/021* (2013.01); *F16H 57/032* (2013.01); *F16H 2057/0068* (2013.01); *Y10T 29/49726* (2015.01)

(58) Field of Classification Search
CPC .......... B23P 6/00; B23P 19/04; F16C 35/077; F16C 2361/65; F16H 1/20; F16H 57/021; F16H 57/032; F16H 2057/0068; F16H 2057/02073; Y10T 29/49726
See application file for complete search history.

(56) References Cited

U.S. PATENT DOCUMENTS

| | | | | |
|---|---|---|---|---|
| 3,667,318 A * | 6/1972 | Lock | ...................... | F16H 57/028 |
| | | | | 74/609 |
| 3,905,250 A * | 9/1975 | Sigg | ........................ | F16C 17/03 |
| | | | | 74/665 N |
| 8,720,055 B2 * | 5/2014 | Flender | ................... | F01L 1/047 |
| | | | | 123/90.6 |
| 10,502,193 B2 * | 12/2019 | Li | ......................... | F16H 37/041 |

* cited by examiner

*Primary Examiner* — Bayan Salone
(74) *Attorney, Agent, or Firm* — Shannon W. Bates; Harper & Bates LLP

(57) ABSTRACT

A gearbox may include a gearbox case with a wear sleeve disposed within a shaft bore, and a gear assembly mounted on a shaft and disposed within the shaft bore. The gear assembly may include a bearing that engages the wear sleeve. A method of repairing a gearbox case may include uncoupling a top piece and a bottom piece of the gearbox case, forming an oversize bore in a shaft bore of the gearbox case to remove a damaged area, and installing a wear sleeve in the oversize bore.

20 Claims, 5 Drawing Sheets

GEARBOX CASE WITH WEAR SLEEVE

CROSS-REFERENCE TO RELATED APPLICATIONS

This application is a continuation of U.S. Non-Provisional patent application Ser. No. 17/586,192, filed Jan. 27, 2022 and entitled "Gearbox Case With Wear Sleeve", which is a continuation of U.S. Non-Provisional patent application Ser. No. 16/792,485, filed Feb. 17, 2020 and entitled "Gearbox Case With Wear Sleeve", now U.S. Pat. No. 11,261,954 issued Mar. 1, 2022, which claims the benefit of U.S. Provisional Patent Application Ser. No. 62/807,456, filed Feb. 19, 2019 and entitled "Gearbox Case With Wear Sleeve", each of which is incorporated herein by reference for all purposes.

TECHNICAL FIELD

The present disclosure relates to a gearbox case, and more particularly, to a gearbox case with wear sleeves in the shaft bores. The present disclosure also relates to a method of repairing a gearbox case by installing wear sleeves in the shaft bores.

BACKGROUND

Gearboxes are used in many industrial applications to transfer energy from one device to another. Gearboxes function to increase torque to an output shaft while reducing the speed of an input shaft. Thus, the output shaft of a gearbox rotates at a slower speed, but with an increased torque resulting from the mechanical advantage produced by reducing the speed across the gearbox.

SUMMARY

The present disclosure is directed to a gearbox case that includes a wear sleeve disposed within a shaft bore. The gearbox case may comprise a top piece and a bottom piece that are coupled together to form the shaft bore. The shaft bore may include an oversize bore adapted to receive the wear sleeve. The depth of the oversize bore may be substantially equal to a wall thickness of the wear sleeve such that the diameter of the shaft bore is substantially uniform across its length. In an implementation, the wall thickness of the wear sleeve is 6.35 mm (¼-inch).

In an implementation, the oversize bore may further include a counterbore adapted to receive a lip of the wear sleeve. The interaction between the counterbore and the lip of the wear sleeve may retain the wear sleeve within the shaft bore and may inhibit longitudinal movement of the wear sleeve within the shaft bore during operation of the gearbox.

The length of the wear sleeve may be substantially equal to or greater than the length of a bearing to be installed in the shaft bore that will engage the wear sleeve. The wear sleeve material may have a strength and wearability that is equal to or greater than the gearbox case material. In an implementation, the wear sleeve is formed of 4140 heat treated steel. In another implementation, the wear sleeve material may have a strength and wearability lower than the gearbox case material such that the wear sleeve functions as an engineered wear point.

In an implementation, the gearbox case further comprises a retaining pin extending radially inwardly from the counterbore, and the wear sleeve further comprises a longitudinal retaining notch adapted to receive the pin. The interaction between the pin and the wear sleeve may retain the wear sleeve within the shaft bore and may inhibit rotational movement of the wear sleeve during operation of the gearbox.

In another implementation, the present disclosure is directed to a gearbox that includes a wear sleeve disposed between a bearing and gearbox case material within a shaft bore.

In yet another implementation, the present disclosure is directed to a method of repairing a gearbox case. The method may comprise uncoupling a top piece and a bottom piece of the gearbox case, forming an oversize bore in a shaft bore of the gearbox case to remove a damaged area, and installing a wear sleeve in the oversize bore. In an implementation, the method further comprises forming a counterbore in the oversize bore, wherein the counterbore receives a lip of the wear sleeve when installing the wear sleeve in the oversize bore. In an implementation, the method further comprises installing a retaining pin in the oversize bore before installing the wear sleeve, and engaging the retaining pin with a notch in the wear sleeve during the step of installing the wear sleeve.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

A gearbox may include a series of integrated gears disposed within a gearbox case. The gears are mounted on shafts positioned within shaft bores formed in the gearbox case. The shafts are supported within the shaft bores by rolling element bearings that allow the shafts and gears to rotate.

In conventional gearboxes, these bearings engage the gearbox case material within the shaft bores. Over time, the bearings start to fail and may become loose and/or cause wear on, and damage to, the gearbox case material within the shaft bores, necessitating a maintenance repair. The frequency of such maintenance repairs depends on how extensively the gearbox is used. In one example, a gearbox used for draw works on a drilling rig, may require a maintenance repair every 2-3 years.

A conventional method of making a maintenance repair is to plane the gearbox case. A gearbox case may include a top piece and a bottom piece that are coupled together. To plane a gearbox case that has been worn or damaged by interaction with the bearings, the two pieces of the gearbox case are separated, then the interior flat areas of the gearbox case on both the top piece and the bottom piece are milled down, and then the shaft bores are bored out to remove the worn and/or damaged areas and to resize the shaft bores appropriately to accommodate the bearings. This conventional repair method is time consuming, expensive, and challenging to complete accurately. In addition, because this method removes material from the gearbox case each time, it can only be performed a limited number of times before the gearbox case must be replaced.

The present disclosure is directed to a gearbox case comprising wear sleeves in the shaft bores. In an implementation, the wear sleeves are positioned within the shaft bores to engage the bearings. As such, as the bearings fail, the bearings will cause wear and/or damage to the wear sleeves rather than to the gearbox case itself. In an implementation, the wear sleeves are removably installed within the gearbox case such that as the wear sleeves are worn and/or damaged by the bearings, they can be replaced. During this repair, the gearbox case material remains intact since the gearbox case is not being planed, and maintenance repairs can be completed indefinitely without requiring replacement of the gearbox case.

Figure 1:
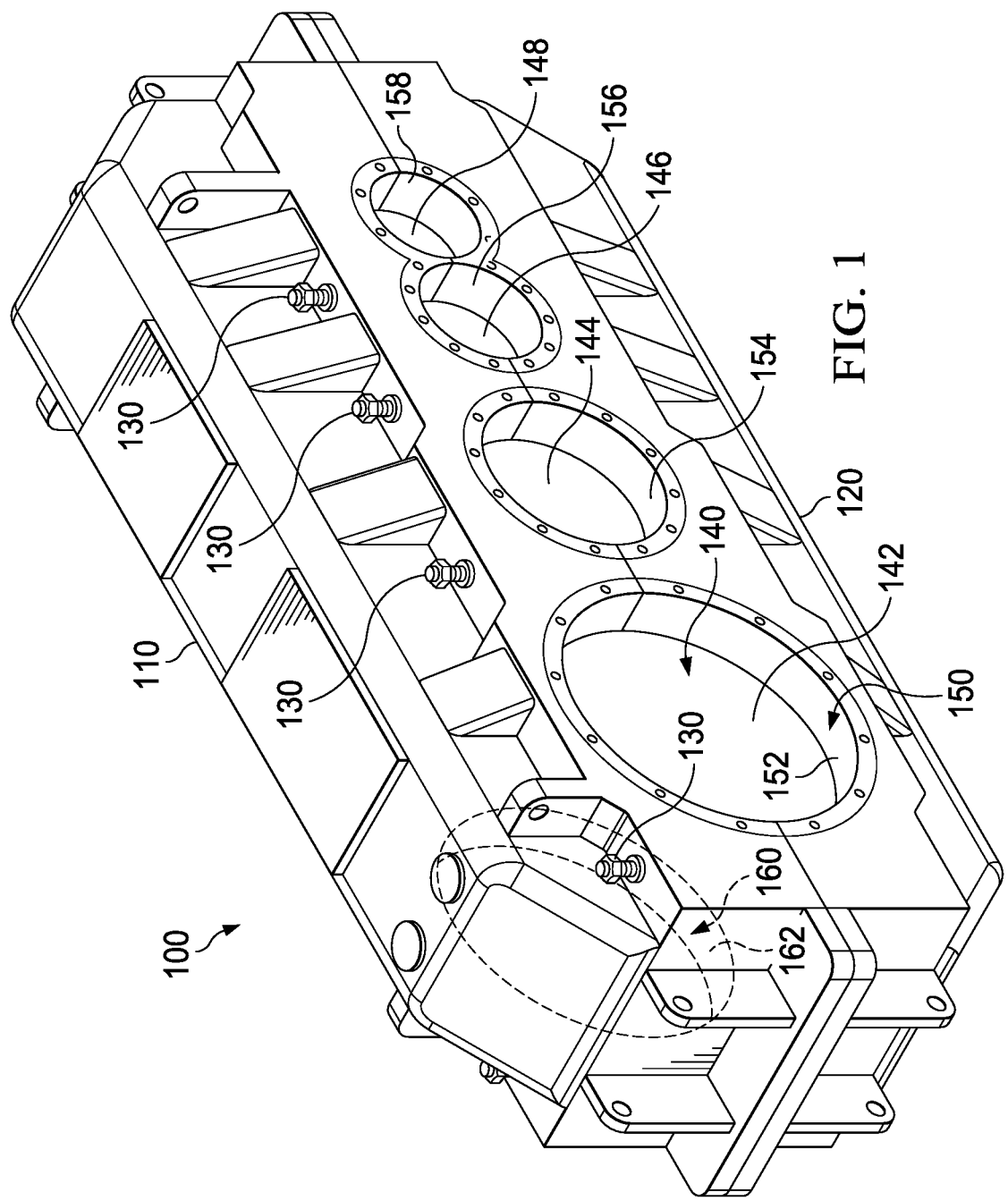
FIG. 1 illustrates a front perspective view of an implementation of a gearbox case with wear sleeves in the shaft bores, according to the present disclosure.

Referring now to the drawings, where like reference numerals represent like components, FIG. 1 illustrates a front perspective view of an implementation of a gearbox case 100 according to the present disclosure. The gearbox case 100 comprises a top piece 110 and a bottom piece 120 coupled together, such as by bolt assemblies 130. The gearbox case 100 further comprises a plurality of shaft bores 140, such as the four shaft bores 142, 144, 146, 148. The gearbox case 100 also comprises a set of wear sleeves 150, 160 for each shaft bore 140, such that a wear sleeve 150 is provided on a first end of each shaft bore 140, and a wear sleeve 160 is provided on the opposite end of each shaft bore 140. As shown in FIG. 1, wear sleeves 152, 162 are provided on opposite ends of shaft bore 142. FIG. 1 also depicts wear sleeve 154 in shaft bore 144, wear sleeve 156 in shaft bore 146, and wear sleeve 158 in shaft bore 148.

Figure 2:
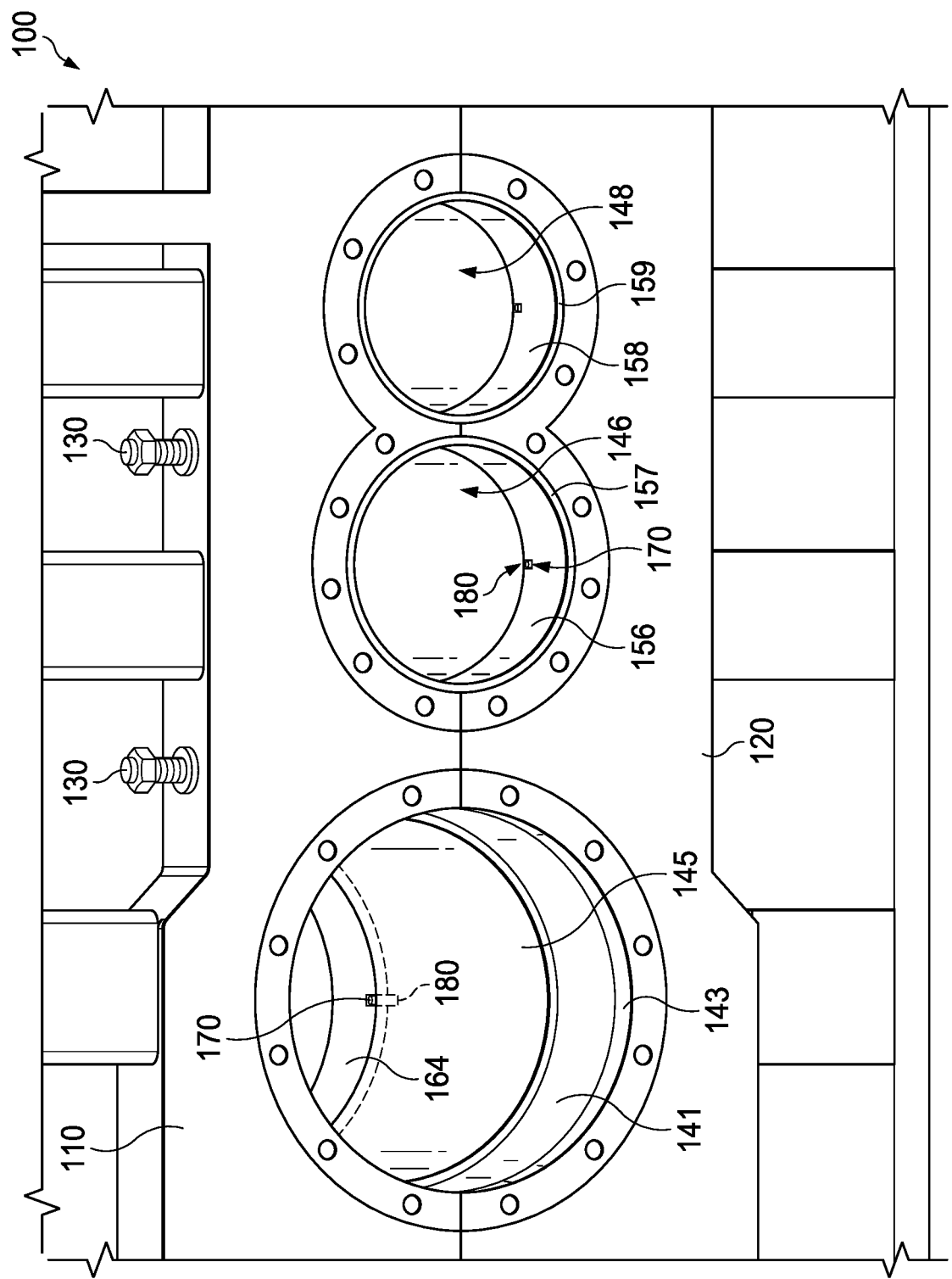
FIG. 2 illustrates a front perspective view of a portion of the gearbox case of FIG. 1, according to the present disclosure.

FIG. 2 illustrates a front perspective view of a portion of the gearbox case 100 of FIG. 1 with wear sleeve 154 removed. In an implementation, before installing the wear sleeves 150, 160 a larger diameter bore or oversize bore, such as oversize bore 141, is formed within the gearbox case at each end of the original shaft bore 145 where the wear sleeves 150, 160 will be installed such that the wear sleeves 150, 160 are retained within the oversize bores. Thus, before the wear sleeves 150, 160 are installed, a multi-diameter bore is formed in the gearbox case 100. The multi-diameter bore includes first and third sections corresponding to the oversize bores at each end, and a second section corresponding to the original shaft bore 145 between the oversize bores. The oversize bores may have a depth substantially equal to the wall thickness of the corresponding wear sleeves 150, 160 such that when the wear sleeves 150, 160 are installed within the oversize bores, the inner diameter of the wear sleeves 150, 160 align with the original shaft bores 145 therebetween to form the shaft bores 140 that are substantially uniform across their length.

In an implementation, adjacent an end of each of the oversize bores the gearbox case includes a counterbore, such as counterbore 143 shown adjacent the end of oversize bore 141. Each of the counterbores is adapted to receive a lip of the wear sleeves 150, 160, such as lips 153, 155, 157, 159, 163, 165, 167, 169 of wear sleeves 152, 154, 156, 158, 162, 164, 166, 168, as depicted in FIGS. 2-5. Therefore, when the wear sleeves 150, 160 are installed within the oversize bores to form the shaft bores 140, the lips of the wear sleeves 150, 160 are retained within the counterbores adjacent the oversize bores. This interaction aids in keeping the wear sleeves 150, 160 in place within the oversize bores and inhibits the wear sleeves 150, 160 from moving longitudinally into the shaft bores 140 during operation.

The gearbox case 100 depicted in FIG. 1 is for a triple-reduction gearbox that may be used, for example, on an AC-drive 1500 Horsepower draw works on a drilling rig. The draw works is a hoisting mechanism with a big spool that raises drilling equipment out of a well bore in a drilling environment. The 1500 Horsepower electric motor input shaft extends into the smallest shaft bore 148 and spins at about 1000 revolutions per minute (rpm). The 1000 rpm from the input shaft is reduced twice by gear assemblies (shown in FIGS. 4 and 5) that extend into the middle shaft bores 144, 146 before reaching the output shaft extending from the largest shaft bore 142 to turn the draw works winch drum at approximately 250-300 rpm and a higher torque achieved by the mechanical advantage obtained through the speed reduction.

In an implementation, the gearbox case 100 may further comprise a retaining pin 170 extending radially inwardly from the bottom piece 120 within each oversize bore. As the wear sleeves 150, 160 are installed in the oversize bores, the retaining pin 170 may be received within a longitudinal notch 180 formed in the wear sleeves 150, 160, such as wear sleeve 156 depicted in FIG. 2.

Figure 3:
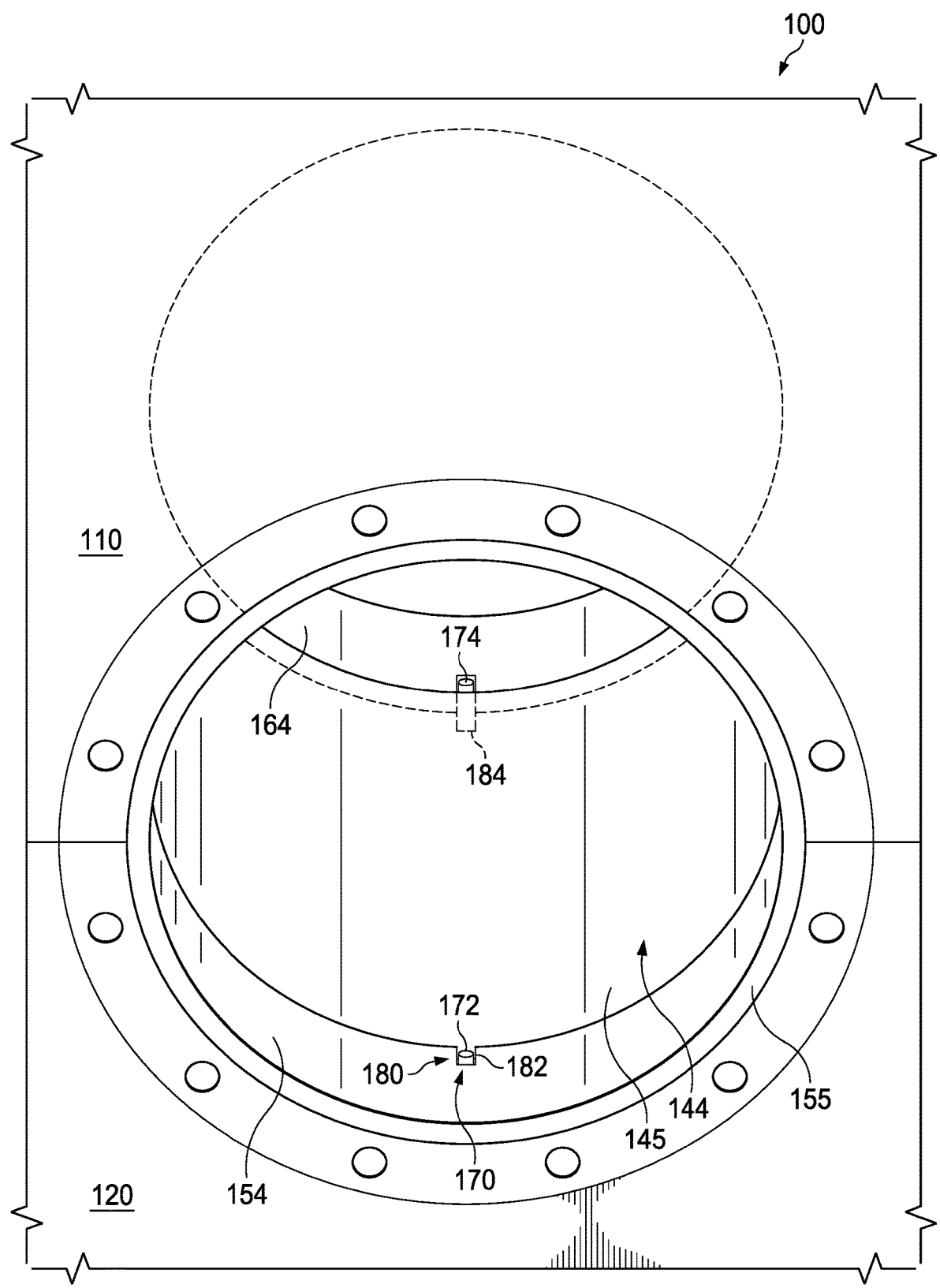
FIG. 3 illustrates an enlarged perspective view of wear sleeves within a single shaft bore of the gearbox case of FIG. 1, according to the present disclosure.

In more detail, FIG. 3 illustrates an enlarged perspective view of the wear sleeves 154, 164 installed within oversize bores formed at opposite ends of the original shaft bore 145 to form shaft bore 144 of the gearbox case 100 shown in FIG. 1. As depicted in FIG. 3, retaining pin 172 is disposed within longitudinal notch 182 of wear sleeve 154, and retaining pin 174 is disposed within longitudinal notch 184 of wear sleeve 164 on the opposite end of shaft bore 144. The retaining pin 170 and notch 180 interaction aids in keeping the wear sleeves 150, 160 in place within the oversize bores and inhibits the wear sleeves 150, 160 from turning with respect to the gearbox case 100 during operation.

Figure 4:
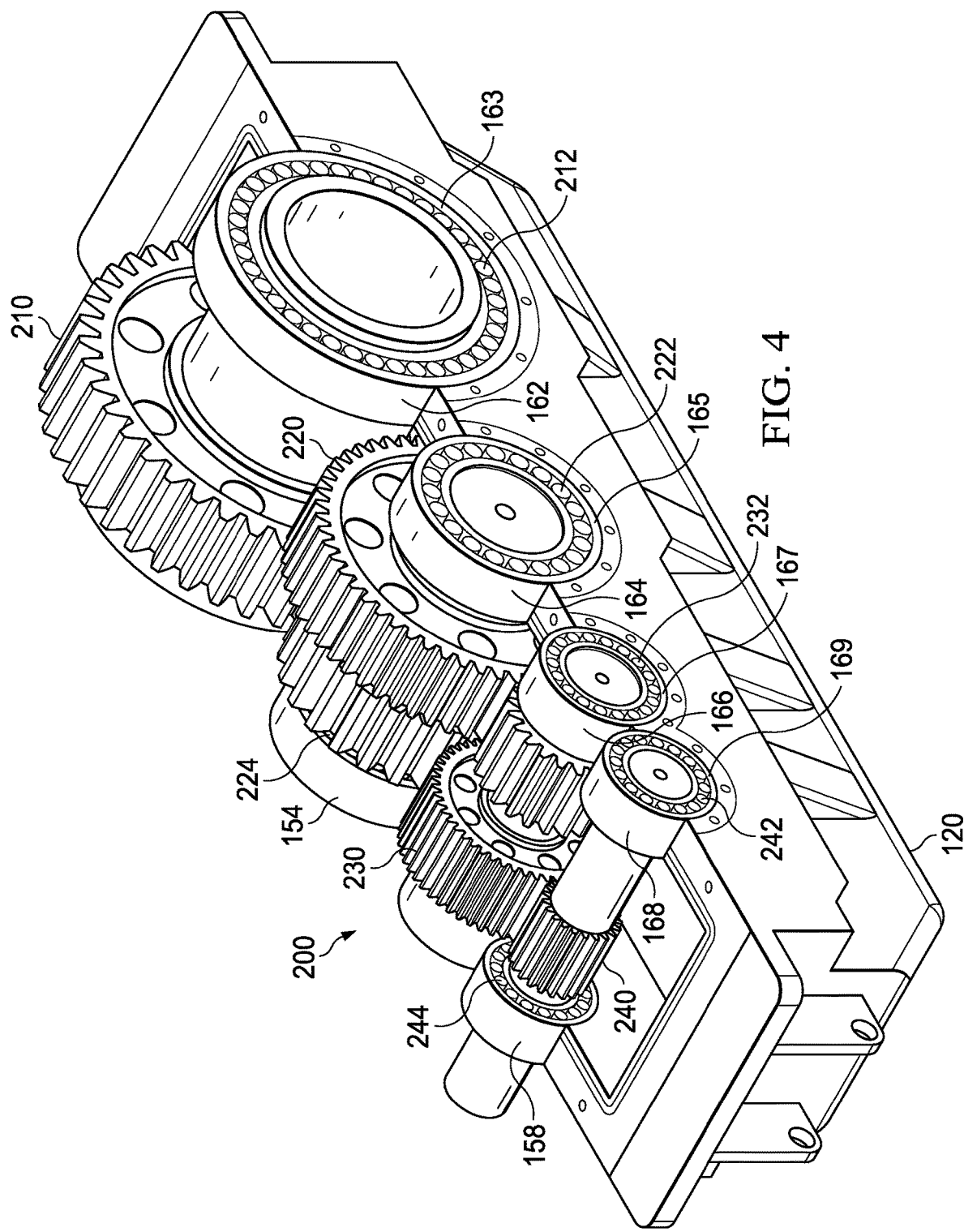
FIG. 4 illustrates a rear perspective view of an implementation of a partially assembled gearbox, depicting the bottom piece of the gearbox case of FIG. 1 with gear assemblies installed within the shaft bores and bearings installed within the wear sleeves, according to the present disclosure.

FIG. 4 illustrates a rear perspective view of an implementation of a partially assembled gearbox 200 with the bottom piece 120 of the gearbox case 100 supporting gear assemblies 210, 220, 230 and 240 disposed within shaft bores 142, 144, 146 and 148, respectively. In this partially assembled gearbox 200, bearings 212, 222, 232 and 242 are shown disposed within and supported by wear sleeves 162, 164, 166 and 168, respectively. On the opposite end of gear assemblies 220 and 240, bearings 224 and 244 are shown disposed within and supported by wear sleeves 154 and 158, respectively.

Figure 5:
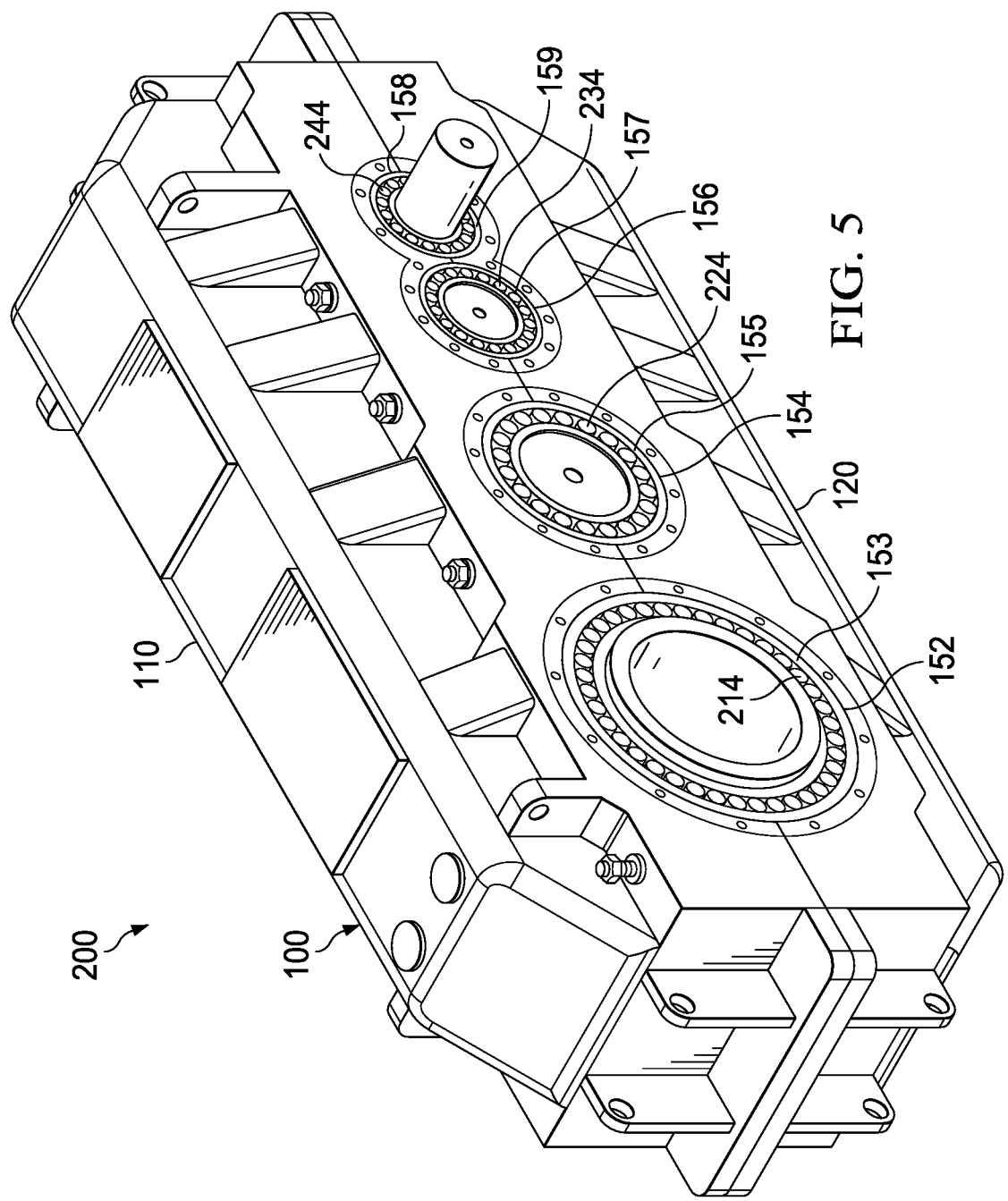
FIG. 5 illustrates a front perspective view of an implementation of a more fully assembled gearbox, depicting the gearbox case of FIG. 1 with bearings installed within the wear sleeves, according to the present disclosure.

FIG. 5 illustrates a front perspective view of an implementation of a more fully assembled gearbox 200, depicting the gearbox case 100 with bearings 214, 224, 234 and 244 installed within wear sleeves 152, 154, 156 and 158, respectively.

In an implementation, the present disclosure is directed to a method of repairing a gearbox case. The method may comprise uncoupling a top piece and a bottom piece of the gearbox case, removing a damaged area of the gearbox case by forming an oversize bore at the end of an original shaft bore of the gearbox case, and installing a wear sleeve in the oversize bore. The method may further comprise forming a counterbore in the gearbox case adjacent an end of the oversize bore before installing the wear sleeve, and receiving a lip of the wear sleeve within the counterbore during the step of installing the wear sleeve. In an implementation, the method further comprises installing a retaining pin in the gearbox case in the oversize bore before installing the wear sleeve, and engaging the retaining pin with a notch in the wear sleeve during the step of installing the wear sleeve.

It is to be understood the implementations are not limited to particular systems or processes described which may, of course, vary. For example, the gearbox case 100 and the gearbox 200 depicted and described herein may be originally manufactured components, or they may result from a repair to a damaged gearbox that did not originally include the wear sleeves 150, 160. In addition, while gearbox case 100 is depicted as forming part of a triple-reduction gearbox 200, the teachings of the present disclosure may be applied to any two-piece (top and bottom) gearbox case.

It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A gearbox comprising:
a shaft bore extending through a gearbox case;
at least one bearing disposed within the shaft bore to support a shaft; and
at least two wear sleeves positioned to protect the gearbox case from being damaged by the at least one bearing;
wherein the at least two wear sleeves form part of the shaft bore; and
wherein the shaft bore has a substantially uniform diameter across its length.

2. The gearbox of claim 1, wherein the gearbox case comprises a top piece and a bottom piece that couple together to create part of the shaft bore.

3. The gearbox of claim 1, wherein the at least two wear sleeves are formed of a material having a strength equal to or greater than a material forming the gearbox case such that the at least two wear sleeves function as reinforcement for the gearbox case.

4. The gearbox of claim 1, wherein the at least two wear sleeves are formed of a material having a strength less than a material forming the gearbox case such that the at least two wear sleeves function as engineered weak points.

5. The gearbox of claim 1, further comprising:
at least two retaining pins, each to retain one of the at least two wear sleeves; and
a longitudinal retaining notch in each of the at least two wear sleeves adapted to receive a retaining pin.

6. The gearbox of claim 5, wherein the at least two retaining pins inhibit rotational movement of the at least two wear sleeves during operation of the gearbox.

7. The gearbox of claim 1, further comprising at least two counterbores, each to interact with a lip of one of the at least two wear sleeves such that the at least two wear sleeves are retained within the shaft bore.

8. The gearbox of claim 7, wherein the at least two counterbores inhibit the longitudinal movement of the at least two wear sleeves during operation of the gearbox.

9. A gearbox comprising:
a multi-diameter bore extending through a gearbox case;
at least one bearing disposed within the multi-diameter bore to support a shaft; and
multiple wear sleeves positioned to protect the gearbox case from being damaged by the at least one bearing;
wherein the multiple wear sleeves are sized and positioned within the multi-diameter bore to form a shaft bore that has a substantially uniform diameter across its length.

10. The gearbox of claim 9, wherein the gearbox case comprises a top piece and a bottom piece that couple together to create at least a portion of the multi-diameter bore.

11. The gearbox of claim 9, wherein at least one of the multiple wear sleeves is formed of a material having a strength equal to or greater than a material forming the gearbox case such that the at least one of the multiple wear sleeves functions as reinforcement for the gearbox case.

12. The gearbox of claim 9, wherein at least one of the multiple wear sleeves is formed of a material having a strength less than a material forming the gearbox case such that the at least one of the multiple wear sleeves functions as an engineered weak point.

13. The gearbox of claim 9, further comprising:
multiple retaining pins, each to retain one of the multiple wear sleeves; and
a longitudinal retaining notch in each of the multiple wear sleeves adapted to receive a retaining pin.

14. The gearbox of claim 13, wherein the multiple retaining pins inhibit the rotational movement of the multiple wear sleeves during operation of the gearbox.

15. The gearbox of claim 9, further comprising multiple counterbores, each to interact with a lip of one of the multiple wear sleeves such that the multiple wear sleeves are retained within the multi-diameter bore.

16. The gearbox of claim 15, wherein the multiple counterbores inhibit the longitudinal movement of the multiple wear sleeves during operation of the gearbox.

17. The gearbox of claim 9, wherein the multiple wear sleeves are substantially identical in size and shape.

18. The gearbox of claim 9, wherein each of the multiple wear sleeves is surrounded by and engages a wall of the gearbox case.

19. The gearbox of claim 1, wherein the at least two wear sleeves are substantially identical in size and shape.

20. The gearbox of claim 1, wherein each of the at least two wear sleeves is surrounded by and engages a wall of the gearbox case.

\* \* \* \* \*